(12) United States Patent
Takatsuki

(10) Patent No.: US 6,233,101 B1
(45) Date of Patent: May 15, 2001

(54) MODIFIED GAUSSIAN LENS

(75) Inventor: Akiko Takatsuki, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/396,419

(22) Filed: Sep. 15, 1999

(30) Foreign Application Priority Data

Sep. 30, 1998 (JP) .................................................. 10-276332
Oct. 14, 1998 (JP) .................................................. 10-291723

(51) Int. Cl.$^7$ .................................................. G02B 9/60
(52) U.S. Cl. .............................................................. 359/768
(58) Field of Search ........................... 359/768, 754–757, 359/759–760, 763–764, 767, 745–746

(56) References Cited

U.S. PATENT DOCUMENTS 5,999,324 * 12/1999 Kohno et al. ........................ 359/740

FOREIGN PATENT DOCUMENTS 55-163509 * 12/1980 (JP) .
56-102819 * 8/1981 (JP) .
57-2013 1/1982 (JP) .
4-177309 * 6/1992 (JP) .

* cited by examiner

Primary Examiner—Georgia Epps
Assistant Examiner—Jordan M. Schwartz
(74) Attorney, Agent, or Firm—Snider & Associates; Ronald R. Snider

(57) ABSTRACT

A modified Gaussian lens comprises, successively from the object side, meniscus first and second lenses $L_1$ and $L_2$ each having a positive refracting power with a convex surface directed onto the object side, a meniscus third lens $L_3$ having a negative refracting power with a concave surface directed onto the image side, a meniscus fourth lens $L_4$ having a negative refracting power with a concave surface directed onto the object side, and a fifth lens $L_5$ made of a biconvex lens; and satisfies the following conditional expressions (1) to (6): (1) $0.37 < f_{1,2}/f < 0.57$, (2) $0.62 < \Sigma d/f < 1.03$, (3) $0.13 < L/f < 0.26$, (4) $22.0 < v_2 - v_3 < 36.0$, (5) $6.0 < (1/R_6 + 1/|R_7|) \times f < 11.2$, (6) $-1.72 < R_{10}/R_{11} 21\ 0$. Thus, while in a compact, five-group, five-element configuration, high performances and conditions suitable for a relatively telephoto lens mounted to a monitor camera or the like, i.e., an F number of about 1.8 and a ratio of focal length to image size of about 4.5, are satisfied.

2 Claims, 5 Drawing Sheets

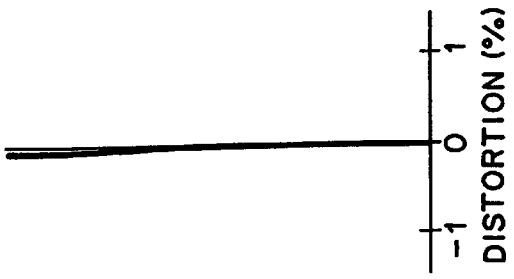
FIG. 2C EXAMPLE 1
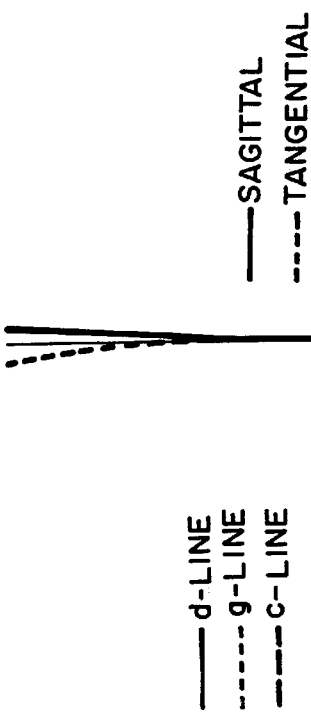
FIG. 2B EXAMPLE 1
FIG. 2A EXAMPLE 1
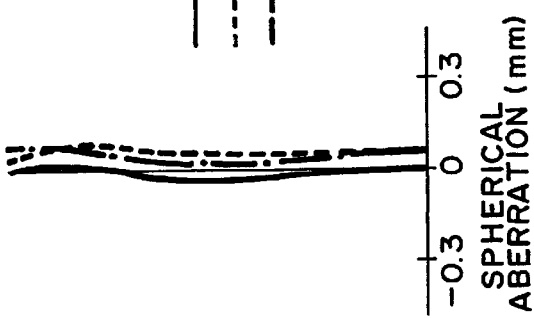
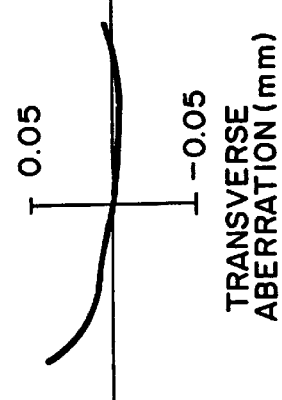
FIG. 2D EXAMPLE 1

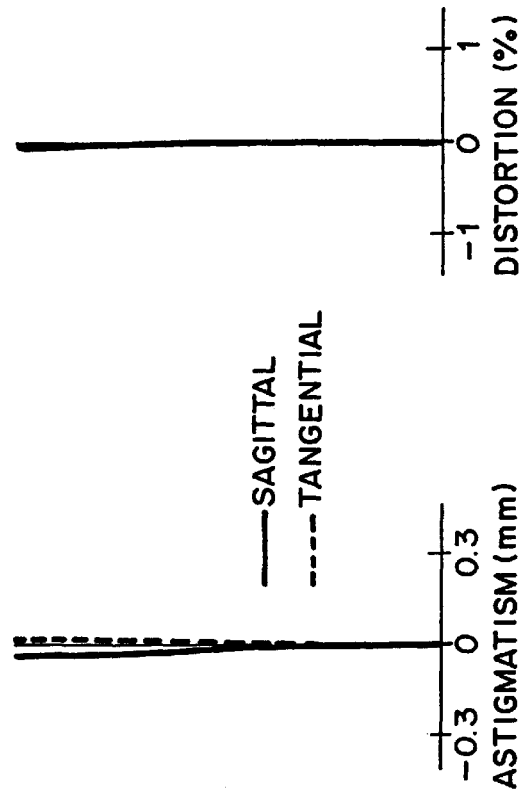
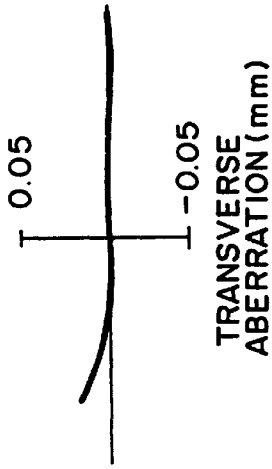

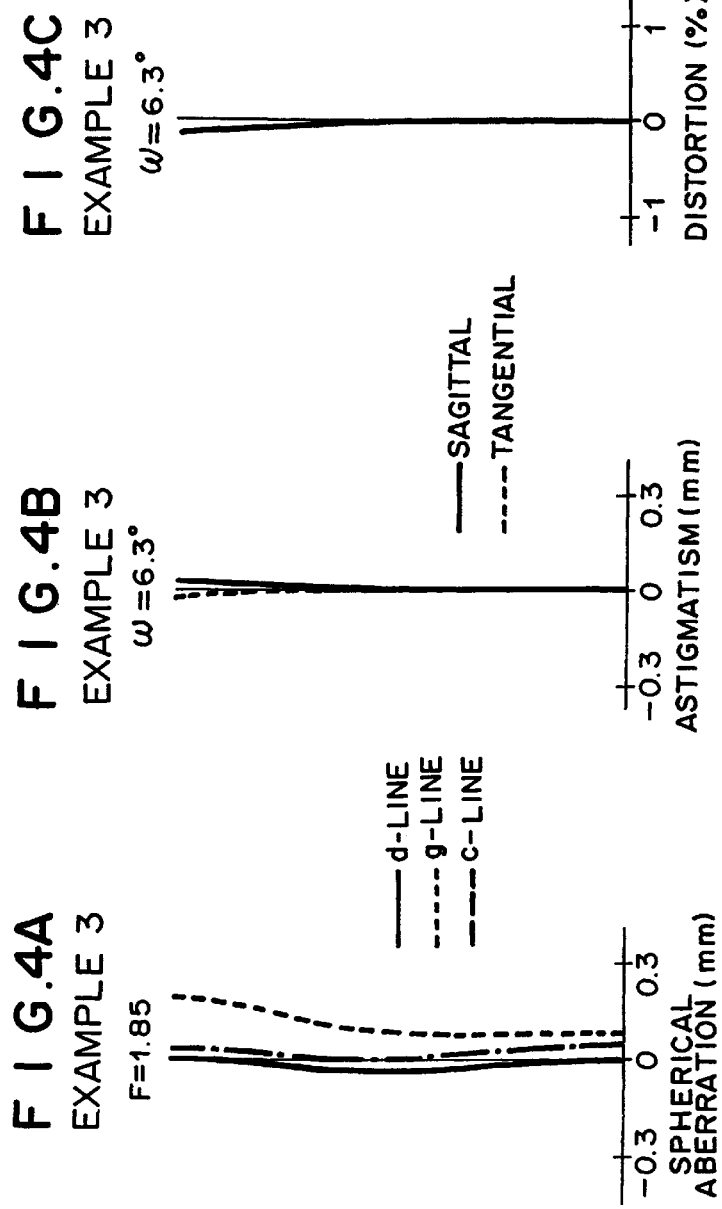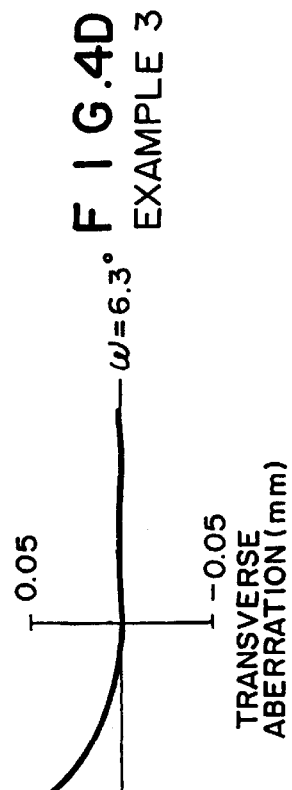

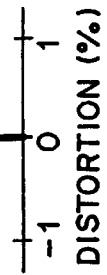
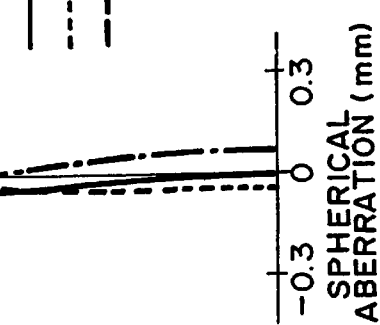
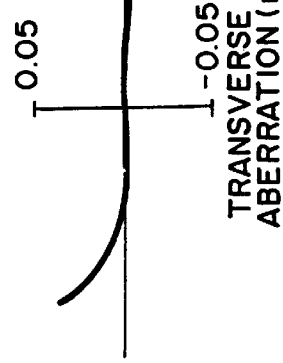

MODIFIED GAUSSIAN LENS

RELATED APPLICATIONS

This application claims the priorities of Japanese Patent Application No. 10-276332 filed on Sep. 30, 1998 and Japanese Patent Application No. 10-291723 filed on Oct. 14, 1998, which are incorporated herein by reference.

BACKGROUND OF THE INVENTION

1. Field of the Invention

The present invention relates to a modified Gaussian lens employed in a monitor camera or the like; and, in particular, to a modified Gaussian lens having a bright F number of about 1.8 and a ratio of focal length to image size of about 4.5.

2. Description of the Prior Art

There has conventionally been known a modified Gaussian lens of a five-group, five-element configuration in which a cemented lens positioned immediately downstream of a stop in a Gaussian lens is constituted by a single lens.

Though such a modified Gaussian lens is advantageous in that the number of lenses is cut down, so that a compactness can be attained, various kinds of aberration such as chromatic aberration are considered to be hard to correct since the lens located immediately downstream of its stop is a single lens. Therefore, the one disclosed in Japanese Unexamined Patent Publication No. 57-2013 defines lens conditions so as to attain performances which are at least as good as those of a Gaussian lens of a six-element configuration.

The prior art disclosed in the above-mentioned publication and the like aim for use as a taking lens of a single-lens reflex camera, and are not intended to be mounted to a monitor camera or the like.

Therefore, such a lens has not satisfied conditions suitable for a relatively telephoto lens mounted to a monitor camera or the like, i.e., an F number of about 1.8 and a ratio of focal length to image size of about 4.5.

SUMMARY OF THE INVENTION

In view of such circumstances, it is an object of the present invention to provide a modified Gaussian lens of a five-group, five-element configuration which satisfies conditions suitable for a relatively telephoto lens mounted to a monitor camera or the like, i.e., an F number of about 1.8 and a ratio of focal length to image size of about 4.5.

The modified Gaussian lens comprising, successively from an object side, meniscus first and second lenses each having a positive refracting power with a convex surface directed onto the object side, a meniscus third lens having a negative refracting power with a concave surface directed onto an image side, a meniscus fourth lens having a negative refracting power with a concave surface directed onto the object side, and a fifth lens made of a biconvex lens, said modified Gaussian lens satisfying the following conditional expression (1):

$$0.37 < f_{1,2}/f < 0.57 \quad (1)$$

where f is the focal length of the whole system; and $f_{1,2}$ is the composite focal length of the first and second lenses;

Preferably, the modified Gaussian lens, further satisfying the following conditional expressions (2) and (3):

$$0.62 < \Sigma d/f < 1.03 \quad (2)$$

$$0.13 < L/f < 0.26 \quad (3)$$

where $\Sigma d$ is the total length of the lens system; and

L is the air space between the third and fourth lenses.

Preferably, the modified Gaussian lens, further satisfying the following conditional expressions (4) to (6) in addition to or without expressions (2) and (3):

$$22.0 < v_2 - v_3 < 36.0 \quad (4)$$

$$6.0 < (1/R_6 + 1/|R_7|) \times f < 11.2 \quad (5)$$

$$-1.72 < R_{10}/R_{11} < 0 \quad (6)$$

where $v_i$ is the Abbe number of the i-th lens; and $R_i$ is the radius of curvature of the i-th surface.

The modified Gaussian lens, further satisfying the following conditional expressions (2) to (6):

$$0.62 < \Sigma d/f < 1.03 \quad (2)$$

$$0.13 < L/f < 0.26 \quad (3)$$

$$22.0 < v_2 - v_3 < 36.0 \quad (4)$$

$$6.0 < (1/R_6 + 1/|R_7|) \times f < 11.2 \quad (5)$$

$$-1.72 < R_{10}/R_{11} < 0 \quad (6)$$

where $\Sigma d$ is the total length of the lens system; and

L is the air space between the third and fourth lenses.

$v_i$ is the Abbe number of the i-th lens; and $R_i$ is the radius of curvature of the i-th surface.

BRIEF DESCRIPTION OF THE DRAWINGS

FIGS. 2A to 2D are aberration charts (showing spherical aberration, astigmatism, distortion, and transverse aberration, respectively) of the lens in accordance with Example 1;

FIGS. 3A to 3D are aberration charts (showing spherical aberration, astigmatism, distortion, and transverse aberration, respectively) of the lens in accordance with Example 2;

FIGS. 4A to 4D are aberration charts (showing spherical aberration, astigmatism, distortion, and transverse aberration, respectively) of the lens in accordance with Example 3; and FIGS. 5A to 5D are aberration charts (showing spherical aberration, astigmatism, distortion, and transverse aberration, respectively) of the lens in accordance with Example 4.

DESCRIPTION OF THE PREFERRED EMBODIMENTS

Figure 1:
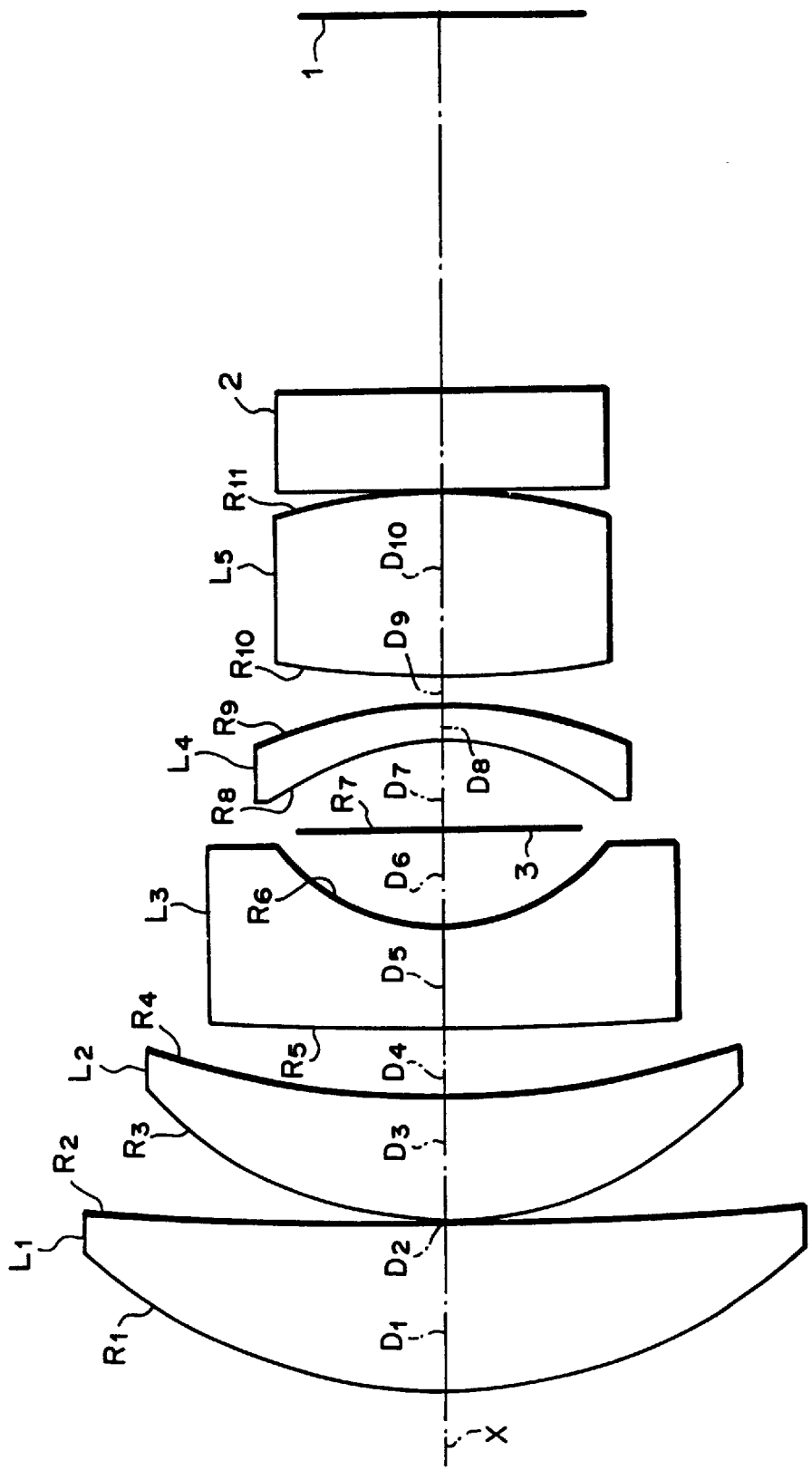
FIG. 1 is the schematic view showing the basic lens configuration in accordance with Example 1 of the present invention.

In the following, modified Gaussian lenses in accordance with embodiments of the present invention will be specifically explained with reference to Examples 1 to 4.

EXAMPLE 1

FIG. 1 shows the basic lens configuration of Example 1. As shown in FIG. 1, the modified Gaussian lens in accordance with Example 1 comprises, successively from the object side, a meniscus first lens $L_1$ having a positive refracting power with a convex surface directed onto the object side, a meniscus second lens $L_2$ having a positive refracting power with a convex surface directed onto the object side, a meniscus third lens $L_3$ having a negative refracting power with a concave surface directed onto the image side, a meniscus fourth lens $L_4$ having a negative refracting power with a concave surface directed onto the object side, and a fifth lens $L_5$ made of a biconvex lens. A luminous flux incident on this modified Gaussian lens along the optical axis X from the object side forms an image on an imaging surface (a light-receiving surface of a solid-state imaging device) 1.

Here, a filter portion 2 including an infrared cutoff filter and a low-pass filter is disposed on the image side of the fifth lens $L_5$.

Also, an aperture stop 3 is disposed between the third lens $L_3$ and the fourth lens $L_4$.

Since thus constituted lens has a five-group, five-element configuration, the whole system can be made compact.

Also, the modified Gaussian lens having the above-mentioned configuration is constructed so as to satisfy the following conditional expressions (1) to (6):

$$0.37 < f_{1,2}/f < 0.57 \quad (1)$$
$$0.62 < \Sigma d/f < 1.03 \quad (2)$$
$$0.13 < L/f < 0.26 \quad (3)$$
$$22.0 < v_2 - v_3 < 36.0 \quad (4)$$
$$6.0 < (1/R_6 + 1/|R_7|) \times f < 11.2 \quad (5)$$
$$-1.72 < R_{10}/R_{11} < 0 \quad (6)$$

where f is the focal length of the whole system;

$f_{1,2}$ is the composite focal length of the first lens $L_1$ and the second lens $L_2$;

$\Sigma d$ is the total length of the lens system;

L is the air space between the third lens $L_3$ and the fourth lens $L_4$;

$v_i$ is the Abbe number of the i-th lens; and $R_i$ is the radius of curvature of the i-th surface.

The technical significance of each of the above-mentioned conditional expressions (1) to (6) will now be explained.

The above-mentioned conditional expression (1) defines a range of the composite focal length of the first lens $L_1$ and the second lens $L_2$. If its upper limit is exceeded, the total length and the effective diameter of the first lens $L_1$ will increase so much that the compactness cannot be attained; whereas spherical aberration and coma will be hard to correct if the lower limit is not satisfied.

The above-mentioned conditional expression (2) defines a range of the total length of the lens system. If its upper limit is exceeded, the diameter of the front-side lenses will increase so much that it becomes difficult to correct the image surface in the periphery of a picture; whereas astigmatism will increase if the lower limit is not satisfied.

The above-mentioned conditional expression (3) defines a range of the air space between the third lens $L_3$ and the fourth lens $L_4$. Astigmatism will be hard to correct if the upper limit is exceeded, whereas the ratio of focal length to image size will decrease if the lower limit is not satisfied.

The above-mentioned conditional expression (4) defines a range of the Abbe numbers of the second lens $L_2$ and the third lens $L_3$. Astigmatism will be corrected in excess if the upper limit is exceeded, whereas axial chromatic aberration will be corrected insufficiently if the lower limit is not satisfied.

The above-mentioned conditional expression (5) defines the radii of curvature of surfaces in front of and behind the stop. Coma will increase if the upper limit is exceeded, whereas spherical aberration, curvature of field, and astigmatism will be hard to correct if the lower limit is not satisfied.

The above-mentioned conditional expression (6) defines the ratio in radius of curvature of the object-side surface to image-side surface of the fifth lens $L_5$. Since an imaging lens used in a photographic camera or the like is required to have a wide field of view, a biconvex lens having a stronger convex surface directed onto the image surface side is often found as the fifth lens $L_5$ in order to favorably correct astigmatism up to the periphery of a picture. In the lens system of the present invention, the ratio of focal length to image size is about 4.5, thus making the lens system relatively telephoto, whereby employing a biconvex lens having a stronger convex surface directed onto the image surface side is not a necessary condition. Hence, a form satisfying conditional expression (6) can favorably correct various kinds of aberration. Namely, astigmatism will be hard to correct in the periphery of a picture if the upper limit of conditional expression (6) is exceeded, whereas spherical aberration will be hard to correct if the lower limit thereof is not satisfied.

The upper part of the following Table 1 shows the radius of curvature R (mm) of each lens surface, center thickness of each lens and air space between neighboring lenses D (mm), refractive index N of each lens at d-line, and Abbe number $v$ of each lens in Example 1.

In Table 1 and Tables 2, 3, and 4 which will follow, numbers referring to letters R, D, N, and $v$ successively increase from the object side.

Further, as shown in the lower part of Table 1, the focal length f of the whole lens system is 52.02 mm, F number is 1.83, back focus Bf is 15.01 mm, and half angle of view $\omega$ is 6.0 degrees. Also, all the above-mentioned conditional expressions (1) to (6) are satisfied as shown in the following Table 5.

EXAMPLE 2

The modified Gaussian lens in accordance with Example 2 has a configuration and effects substantially similar to those of the lens in accordance with the above-mentioned Example 1 shown in FIG. 1.

The upper part of the following Table 2 shows the radius of curvature R (mm) of each lens surface, center thickness of each lens and air space between neighboring lenses D (mm), refractive index N of each lens at d-line, and Abbe number $v$ of each lens in Example 2.

Further, as shown in the lower part of Table 2, the focal length f of the whole lens system is 52.03 mm, F number is 1.80, back focus Bf is 15.01 mm, and half angle of view $\omega$ is 6.0 degrees. Also, all the above-mentioned conditional expressions (1) to (6) are satisfied as shown in the following Table 5.

EXAMPLE 3

The modified Gaussian lens in accordance with Example 3 has a configuration and effects substantially similar to those of the lens in accordance with the above-mentioned Example 1 shown in FIG. 1.

The upper part of the following Table 3 shows the radius of curvature R (mm) of each lens surface, center thickness of each lens and air space between neighboring lenses D (mm), refractive index N of each lens at d-line, and Abbe number ν of each lens in Example 3.

Further, as shown in the lower part of Table 3, the focal length f of the whole lens system is 50.04 mm, F number is 1.85, back focus Bf is 15.23 mm, and half angle of view ω is 6.3 degrees. Also, all the above-mentioned conditional expressions (1) to (6) are satisfied as shown in the following Table 5.

EXAMPLE 4

The modified Gaussian lens in accordance with Example 4 has a configuration and effects substantially similar to those of the lens in accordance with the above-mentioned Example 1 shown in FIG. 1.

The upper part of the following Table 4 shows the radius of curvature R (mm) of each lens surface, center thickness of each lens and air space between neighboring lenses D (mm), refractive index N of each lens at d-line, and Abbe number ν of each lens in Example 4.

Further, as shown in the lower part of Table 4, the focal length f of the whole lens system is 51.37 mm, F number is 1.80, back focus Bf is 15.13 mm, and half angle of view ω is 6.1 degrees. Also, all the above-mentioned conditional expressions (1) to (6) are satisfied as shown in the following Table 5.

FIGS. 2A to 2D, 3A to 3D, 4A to 4D, and 5A to 5D show various kinds of aberration (spherical aberration, astigmatism, distortion, and transverse aberration) of the above-mentioned Examples 1, 2, 3, and 4, respectively. In these aberration charts, ω indicates the half angle of view. As can be seen from FIGS. 2A to 2D, 3A to 3D, 4A to 4D, and 5A to 5D, various kinds of aberration can be made favorable in accordance with these embodiments.

Between the modified Gaussian lens and the imaging surface (the light-receiving surface of the solid-state imaging device) 1, a plate of cover glass may be inserted together with the low-pass filter and the infrared cutoff filter.

As explained in the foregoing, since predetermined conditional expressions (1) to (6) are satisfied, the modified Gaussian lens in accordance with the present invention can yield a high-performance lens system suitable for a monitor camera or the like, which satisfies conditions that the F number is about 1.8 and the ratio of focal length to image size is about 4.5, while in a compact five-group, five-element configuration.

TABLE 1

| | Example 1 | | | |
|---|---|---|---|---|
| Surface | R | D | $N_d$ | $\mu_d$ |
| 1 | 21.243 | 6.77 | 1.62041 | 60.3 |
| 2 | 177.354 | 0.11 | | |
| 3 | 16.011 | 5.06 | 1.62041 | 60.3 |
| 4 | 37.176 | 2.68 | | |
| 5 | 146.029 | 4.01 | 1.80517 | 25.4 |
| 6 | 8.375 | 4.00 | | |
| 7 | ∞ | 3.57 | (Stop) | |
| 8 | −11.356 | 1.42 | 1.51823 | 58.9 |
| 9 | −19.516 | 1.20 | | |
| 10 | 39.008 | 7.62 | 1.70153 | 41.2 |
| 11 | −23.134 | | | |

TABLE 1-continued

| | Example 1 | | | |
|---|---|---|---|---|
| Surface | R | D | $N_d$ | $\mu_d$ | f = 52.02
FNO = 1.83
Bf = 15.01

TABLE 2

| | Example 2 | | | |
|---|---|---|---|---|
| Surface | R | D | $N_d$ | $\nu_d$ |
| 1 | 32.545 | 10.00 | 1.62041 | 60.3 |
| 2 | 2137.567 | 0.11 | | |
| 3 | 20.088 | 6.36 | 1.62041 | 60.3 |
| 4 | 38.755 | 2.89 | | |
| 5 | 108.624 | 4.15 | 1.80517 | 25.4 |
| 6 | 13.431 | 4.00 | | |
| 7 | ∞ | 3.46 | (Stop) | |
| 8 | −20.939 | 4.90 | 1.51823 | 58.9 |
| 9 | −22.837 | 1.20 | | |
| 10 | 28.935 | 9.36 | 1.70153 | 41.2 |
| 11 | −440.980 | | | | f = 52.03
FNO = 1.80
Bf = 15.01

TABLE 3

| | Example 3 | | | |
|---|---|---|---|---|
| Surface | R | D | $N_d$ | $\nu_d$ |
| 1 | 21.461 | 6.19 | 1.62041 | 60.3 |
| 2 | 252.452 | 0.11 | | |
| 3 | 15.594 | 4.55 | 1.62041 | 60.3 |
| 4 | 32.633 | 2.59 | | |
| 5 | 112.286 | 4.01 | 1.80517 | 25.4 |
| 6 | 9.332 | 4.00 | | |
| 7 | ∞ | 3.67 | (Stop) | |
| 8 | −14.001 | 1.27 | 1.51823 | 58.9 |
| 9 | −22.168 | 2.62 | | |
| 10 | 29.990 | 2.97 | 1.70153 | 41.2 |
| 11 | −44.939 | | | | f = 50.04
FNO = 1.85
Bf = 15.23

TABLE 4

| | Example 4 | | | |
|---|---|---|---|---|
| Surface | R | D | $N_d$ | $\nu_d$ |
| 1 | 22.338 | 7.21 | 1.62041 | 60.3 |
| 2 | 218.053 | 0.10 | | |
| 3 | 17.836 | 4.65 | 1.61772 | 49.8 |
| 4 | 33.864 | 3.42 | | |
| 5 | 362.295 | 1.00 | 1.78469 | 26.3 |
| 6 | 11.879 | 6.05 | | |
| 7 | ∞ | 6.58 | (Stop) | |
| 8 | −15.104 | 2.49 | 1.51823 | 58.9 |
| 9 | −16.110 | 0.64 | | |
| 10 | 28.549 | 10.00 | 1.70153 | 41.2 |
| 11 | −223.500 | | | | f = 51.37
FNO = 1.80
Bf = 15.13

TABLE 5

| | Example 1 | Example 2 | Example 3 | Example 4 |
|---|---|---|---|---|
| (1) $f_{1,2}/f$ | 0.40 | 0.55 | 0.42 | 0.46 |
| (2) $\Sigma d/f$ | 0.70 | 0.89 | 0.64 | 0.82 |
| (3) $L/f$ | 0.15 | 0.14 | 0.15 | 0.25 |
| (4) $v_2-v_3$ | 34.9 | 34.9 | 34.9 | 23.5 |
| (5) $(1/R_6 + 1/|R_7|) \cdot f$ | 10.8 | 6.4 | 8.9 | 7.7 |
| (6) $R_{10}/R_{11}$ | −1.69 | −0.07 | −0.67 | −0.13 |

What is claimed is:

1. A modified Gaussian lens comprising, successively from an object side, meniscus first and second lenses each having a positive refracting power with a convex surface directed onto the object side, a meniscus third lens having a negative refracting power with a concave surface directed onto an image side, a meniscus fourth lens having a negative refracting power with a concave surface directed onto the object side, and a fifth lens made of a biconvex lens, said Gaussian lens satisfying the following conditional expression (1):

$$0.37 < f_{1,2}/f < 0.57 \qquad (1)$$

where f is the focal length of the whole system;

$f_{1,2}$ is the composite focal length of the first and second lenses;

further satisfying the following conditional expressions (4) to (6):

$$22.0 < v_2 - v_3 < 36.0 \qquad (4)$$

$$6.0 < (1/R_6 + 1/|R_7|) \times f < 11.2 \qquad (5)$$

$$-1.72 < R_{10}/R_{11} < 0 \qquad (6)$$

where $v_i$ is the Abbe number of the i-th lens; and $R_i$ is the radius of curvature of the i-th surface (only lens surface).

2. A modified Gaussian lens according to claim 1, further satisfying the following conditional expressions (2) and (3):

$$0.62 < \Sigma d/f < 1.03 \qquad (2)$$

$$0.13 < L/f < 0.26 \qquad (3)$$

where $\Sigma d$ is the total length of lens system; and

L is the air space between the third and fourth lenses.

* * * * *

UNITED STATES PATENT AND TRADEMARK OFFICE
CERTIFICATE OF CORRECTION

PATENT NO. : 6,233,101 B1  
DATED : May 15, 2001  
INVENTOR(S) : Akiko Takatsuki Page 1 of 1

It is certified that error appears in the above-identified patent and that said Letters Patent is hereby corrected as shown below:

<u>Column 8,</u>  
Line 13, delete "$v_1$" and insert -- $v_i$ --.

Signed and Sealed this

Eighth Day of January, 2002

Attest:

JAMES E. ROGAN  
*Attesting Officer*     *Director of the United States Patent and Trademark Office*